United States Patent [19]

Lacombe

[11] Patent Number: 5,007,508
[45] Date of Patent: Apr. 16, 1991

[54] FRICTION SYSTEM USING REFRACTORY COMPOSITE MATERIALS

[75] Inventor: Alain Lacombe, Pessac, France

[73] Assignee: Societe Europeenne de Propulsion, Suresness, France

[21] Appl. No.: 488,481

[22] Filed: Mar. 1, 1990

Related U.S. Application Data

[63] Continuation of Ser. No. 248,319, Sep. 16, 1988, abandoned, which is a continuation of Ser. No. 10,321, Feb. 3, 1987, abandoned.

[30] Foreign Application Priority Data

Feb. 5, 1986 [FR] France .................. 86 01590

[51] Int. Cl.$^5$ .................. F16D 65/12; F16D 69/02
[52] U.S. Cl. .................. 188/251 A; 188/73.1; 192/107 M
[58] Field of Search .............. 188/251 R, 251 A, 73.1, 188/73.2; 192/107 M

[56] References Cited

U.S. PATENT DOCUMENTS

| | | | |
|---|---|---|---|
| 3,639,197 | 2/1972 | Spain | 188/251 A X |
| 3,692,150 | 9/1972 | Ruppe, Jr. | 188/251 A X |
| 3,712,428 | 1/1973 | Marin | 188/73.2 X |
| 3,897,582 | 7/1975 | Olcott | 428/114 |
| 3,966,029 | 6/1976 | Spain | 188/251 A X |
| 4,051,930 | 10/1977 | Masclet | 188/251 A |
| 4,457,967 | 7/1984 | Chareire | 188/251 A X |
| 4,576,836 | 3/1986 | Colmet et al. | 427/255 |
| 4,752,503 | 6/1988 | Thebault | 427/248.1 |

FOREIGN PATENT DOCUMENTS

| | | |
|---|---|---|
| 2151133 | 4/1973 | France . |
| 2034835A | 6/1980 | United Kingdom . |
| 2151729A | 7/1985 | United Kingdom . |

OTHER PUBLICATIONS

NASA Technical Memorandum 78904 (NASA-TM-78904), entitled "Friction and Wear of Carbon--Graphite Materials for High-Energy Brakes", presented by Robert C. Bill at the Second International Conference on Solid Lubrication, Denver, Colorado, Aug. 14–18, 1978.

Primary Examiner—George E. A. Halvosa
Attorney, Agent, or Firm—Weingarten, Schurgin, Gagnebin & Hayes

[57] ABSTRACT

A friction system comprising at least two frictionally coupled elements produced of refractory composite materials, wherein one of the friction elements is a carbon-carbon composite material whereas the second friction element is a composite material constituted of a fibrous reinforcement in which the fibers are selected from carbon fibers and silicon carbide fibers, and of a two-phased matrix of which the principal phase is constituted by silicon carbide.

7 Claims, 3 Drawing Sheets

FRICTION SYSTEM USING REFRACTORY COMPOSITE MATERIALS

RELATED APPLICATION INFORMATION

This application is a continuation of U.S. patent application Ser. No. 07/248,319 filed Sept. 16, 1988 now abandoned which was a continuation of U.S. patent application Ser. No. 07/010,321 filed Feb. 3, 1987 now abandoned.

The present invention relates to a friction system comprising at least two frictionally coupled elements produced of refractory composite materials.

The field of application of the invention includes braking systems and friction clutch systems, and in particular aircraft brakes.

BACKGROUND OF THE INVENTION

Aircraft brakes are generally multidisc systems in which fixed discs and movable discs are placed in contact in order to generate, by friction, a retarding power. The friction materials constituting the discs or the friction pads placed on said discs are required to re-group a number of properties which will enable them to withstand the thermal and mechanical stresses to which they are exposed, and to have a friction coefficient which is reproducible and stable in the field and the various conditions of use, as well as a strictly controlled abrasion factor.

Refractory composite materials and in particular carbon-carbon composite materials are, among the recently developed friction materials, those which are best suited for the aforesaid application.

The carbon-carbon composites which have a very high specific heat, increasing rapidly with the temperature and this up to above 2000° C., and show strong thermo-mechanical strength against thermal stresses and fatigue, stand up well to friction on themselves. This has prompted the advantageous introduction in multidiscs systems of monobloc friction discs made entirely of carbon-carbon.

Yet, the coefficient of friction of carbon-carbon composites on themselves remains small at temperatures as low as about 100° C. At that temperature, the friction coefficient changes and reaches a value which it will keep in average up to very high temperatures of between 1500° C. and 2000° C., despite rather high perturbations. Moreover, the coefficient of friction of carbon-carbon composites on themselves is sensitive to the environmental conditions, and in particular to the action of humidity. There is also a low static friction coefficient which, being lower than the dynamic friction coefficient, can be an impediment in applications requiring prolonged stops.

Moreover, although the carbon-carbon composites have volume abrasion factors with respect to the absorbed energy which, compared to those of the conventional materials, are relatively low inside a wide range of operation, oxidation is an appreciable cause of increase of those factors, at temperatures exceeding 400° C. to 500° C. The oxidation effect is all the more pronounced that the temperature is high and that the dwelling time at that temperature is long.

SUMMARY OF THE INVENTION

It has been proposed to use as friction material a composite having a carbon fiber reinforcement and a mixed matrix composed of carbon and silicon carbide.

Tests conducted by the applicant have shown that the use of silicon carbide really improves, as could be expected, the resistance to abrasion caused by oxidation, and this up to over 1000° C. These tests have also shown that such composites with carbon/silicon carbide mixed matrix lead, when in frictional contact with themselves, to stable and reproducible friction levels, without any sudden discontinuity, and that they have a static friction coefficient at least equivalent to the dynamic friction coefficient. These advantages, coupled with a very high thermo-mechanical strength, make these materials particularly suitable for use in friction applications.

Nonetheless, silicon carbide is well known for its abrasive properties and in order to limit the wear through abrasion, the grains of silicon carbide must be as small as possible. The chemical vapor deposition of the silicon carbide makes it possible to obtain small-sized grains, but this technique is expensive.

It is the object of the present invention to propose a friction system which uses refractory composite materials with none of the disadvantages presented by the carbon-carbon composites in friction on themselves, and which are not too expensive to use.

This object is reached with a friction system which comprises at least two elements in frictional contact and in which, according to the invention, one of the friction elements is made of a carbon-carbon composite material, whereas the other friction element is of a composite material containing a fibrous reinforcement, the reinforcing fibers of which are selected from carbon fibers and silicon carbide fibers, and a two-phase matrix, the main phase of which is silicon carbide.

The frictional coupling of a C—C (carbon-carbon) composite with a composite having a C- or SiC-reinforcement and a matrix principally of SiC has been found to prevent the disadvantages of the C—C composites used in friction on themselves, and this at a much lower cost than the couplings of SiC—SiC or C—SiC composites in friction on themselves. Furthermore, and quite unexpectedly, the coupling according to the invention does not involve any more wearing down of the carbon-carbon, as might have been expected in view of the abrasive nature of the silicon carbide, and besides, the abrasion factor is virtually nil for the composite with a matrix containing silicon carbide, i.e. for the most expensive friction element.

In the refractory composite material which is coupled with the C—C composite according to the invention, the reinforcement is made with carbon or silicon carbide fibers.

Whatever the nature of the fibers, the reinforcement may take on the form of a stacking of random layers, of felts, fabrics, webs of tows or other forms of textiles, needled or not, or else the form of a three-dimensional structure or any other structure similarly lending itself to a spacial distribution of the mechanical reinforcement. The fibrous reinforcement thus constitutes a porous substrate of which the fibers volume content can vary between 10 and 40% in order to obtain the required mechanical reinforcement qualities while leaving sufficient porosity for densification by the material of the matrix.

The major part of this matrix is constituted by silicon carbide which forms the principal phase.

The remainder of said matrix is constituted by a secondary refractory phase whose function is to accommodate the transfer of mechanical loads between the fibers and the principal phase of the matrix. In the case of a carbon fiber reinforcement, the secondary phase should also contribute to the protection of the fibers against oxidation.

Among the materials suitable to constitute the secondary phase are titanium, zirconium, tantalum or boron carbides, elemental boron, silicon nitride, boron nitride, and pyrolytic carbon. Preferably, pyrolytic carbon or boron nitride will be used.

Industrially, the deposition of pyrolytic carbon by a chemical vapor deposition technique is perfectly under control, and permits a good mechanical accommodation between the fibers and the silicon carbide.

The chemical vapor deposition of boron nitride is similarly well under control. With it, a homogeneous deposit is obtained which, in addition to a good mechanical adaptation, shows a good resistance to oxidation up to about 800° C. to 900° C., and offers excellent protection to the carbon reinforcements.

Concerning the deposition of an intermediate phase of pyrocarbon or boron nitride, reference should be made to French Patent No. 2,567,874.

The volume content of the deposited intermediate phase can vary between 5 and 25% of the total volume of the final material. Once the intermediate phase is deposited, the preparation of the matrix continues with the infiltration of the principal phase of silicon carbide.

Such infiltration of silicon carbide is obtained, in a manner known per se, by chemical vapor deposition. Reference can be made to French Patents Nos. 2,401,888 and 2,520,352. The volume content of silicon carbide in the prepared composite can vary between 40 and 80% so that the volume content of porosities left in the resulting composite material remains under 10%. It is advantageous for this residual porosity content to stay as low as possible in order to avoid the retention of wear particles of an abrasive nature and also to limit the oxidation of the reinforcement when said reinforcement is of carbon fibers.

According to the invention, the composite materials with C or SiC fibrous reinforcement and mainly SiC matrix, such as described hereinabove, are used in friction on carbon-carbon composite materials.

The latter are well known in applications using them in friction on themselves and therefore, their structure and preparation method need not be described in detail herein. The carbon fiber reinforcement can be in the form of a stack of random layers, of felts, fabrics, webs of tows or other textile forms, needled or not, or it can be in the form of a three-dimensional structure. The carbon matrix is infiltrated through the fibrous reinforcement preferably by chemical vapor deposition of pyrocarbon.

As indicated hereinabove, the frictional coupling of composite materials having a C or SiC reinforcement and a mainly SiC matrix, with C—C composite materials, eliminates the disadvantages of the C—C composite materials used in friction on themselves. Among the performances of such friction couplings, we find:

an excellent reproducibility and stability of the friction coefficient, a quasi-insensitivity of the friction to environmental conditions, and in particular to humidity, a preservation of the friction characteristics up to temperatures exceeding 1200° C., a small tendency of the friction coefficient to increase with the specific pressure, a decreasing continuous variation of the friction coefficient of about 0.40 at low speed to about 0.30 around 20 m/s, speed beyond which the friction coefficient is about constant, all other things being equal, a near-zero wearing factor for the refractory composite with a mainly SiC matrix and a wearing factor around $10.10^{-5}$ mm3/J for the C—C composite within the range of friction temperatures less than 500° C.

It is now possible with the above-listed characteristics, to produce friction systems such as disc brakes and clutch and friction clutch systems.

In the multi-disc brakes, the rotor discs may be produced of C—C composite and the stator discs of refractory composite with a mainly SiC matrix, or vice versa.

Disc brakes may be produced with caliper pads of C—C composite and with one disc, of which at least the friction parts are of refractory composite with a mainly SiC matrix, this advantageously preventing the disc from wearing.

BRIEF DESCRIPTION OF THE DRAWINGS

The invention will be more readily understood on reading the following description with reference to the accompanying drawings, in which.

DETAILED DESCRIPTION

Figure 3:
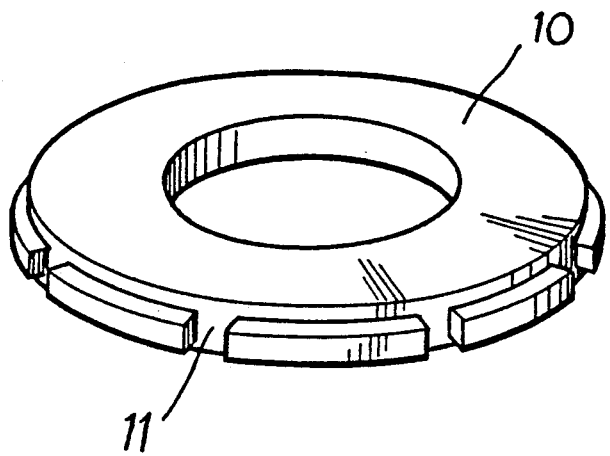
FIGS. 3 and 4 show elements of multi-disc brakes.
Figure 4:
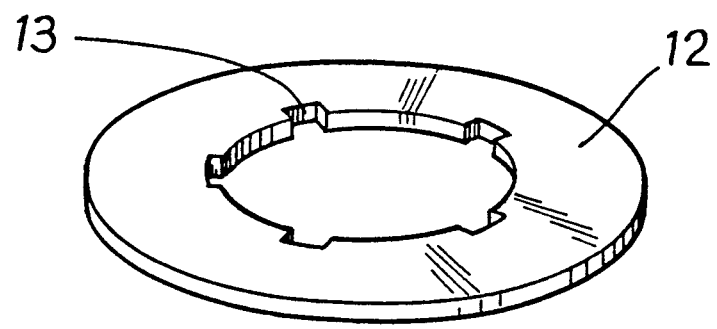
Figure 5:
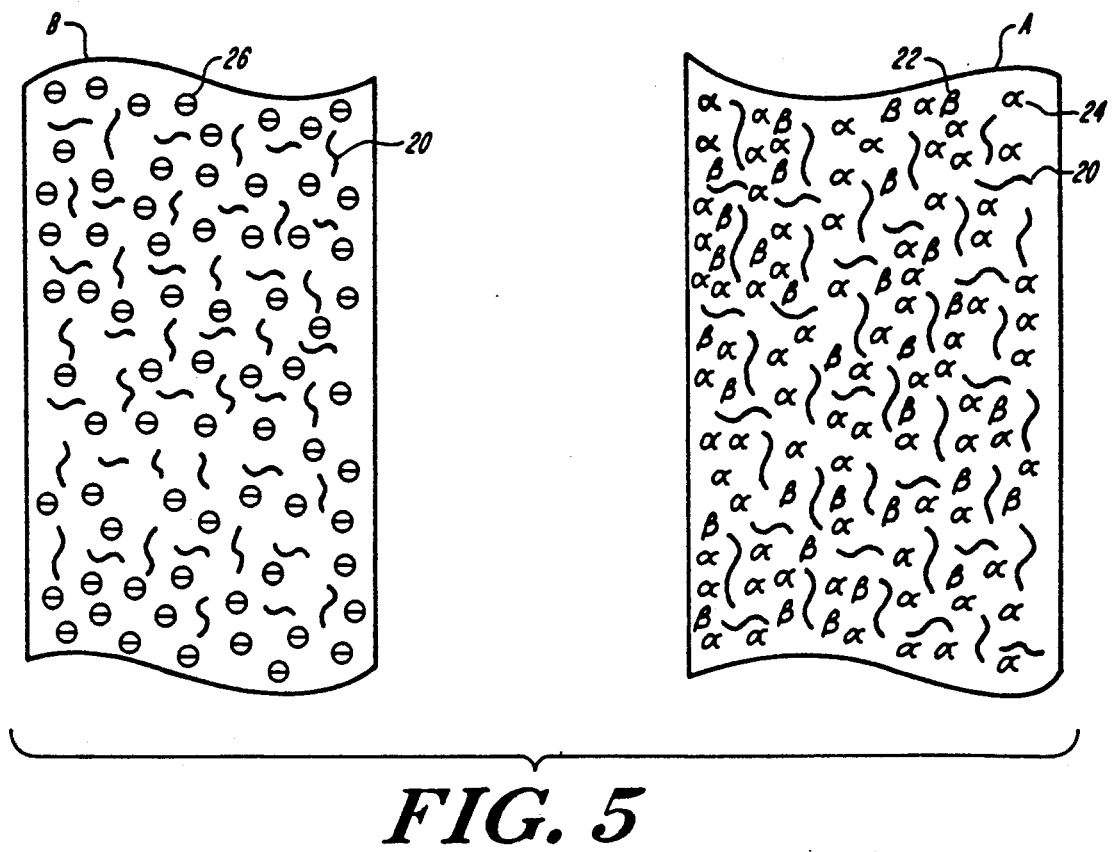
FIG. 5 illustrates the composition of a friction system having first and second elements according to the invention.

Referring now to FIGS. 1-5, FIG. 1 shows the monobloc disc 1 produced of refractory composite constituted as follows as generally illustrated by element A in FIG. 5;

three-dimensional reinforcement formed of needled felts of carbon fibers 20 with an 18% fiber volume content, core-through deposition of pyrolytic carbon 22 with a 5% volume content, and infiltration of silicon carbide 24 at a 69% volume content.

Disc 1 comprises an inner attachment ring 2 on the inner periphery of which are provided notches 3 with rounded bottoms. The disc is attached to the hub of the wheel via a metallic bowl 4 on which it is mounted so as to be axially floating by means of quadrant pieces 5 housed in the notches 3, and tightening means 6.

Figure 1:
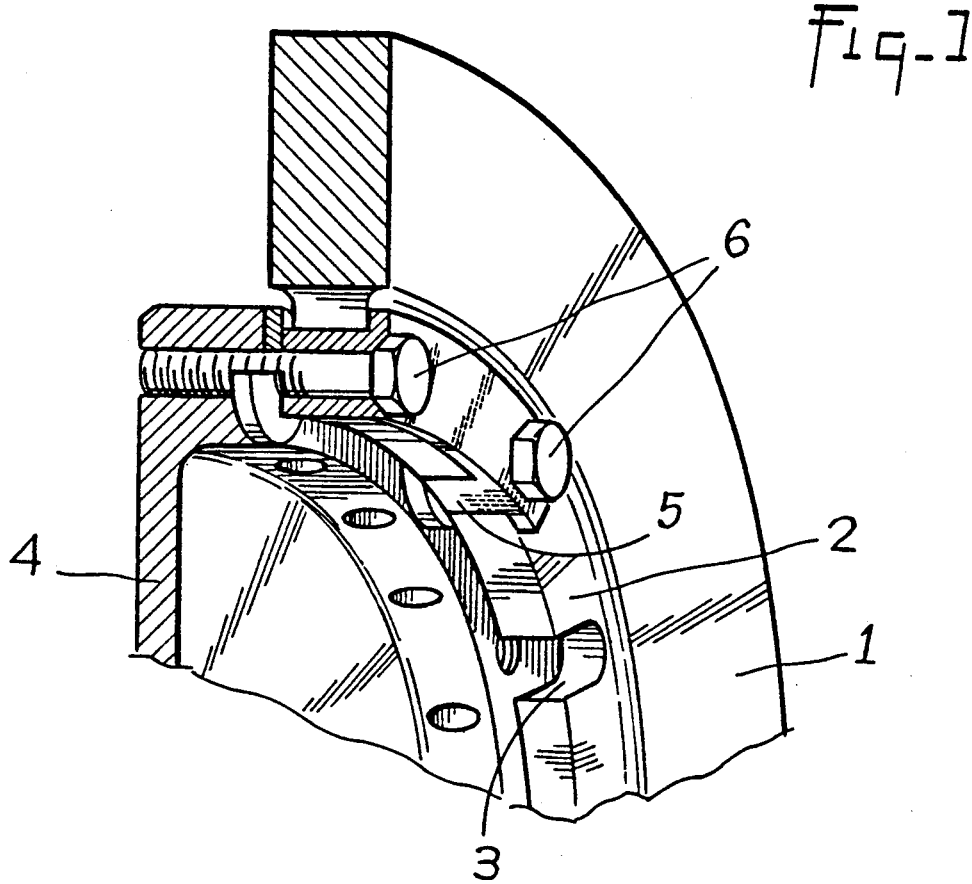
FIGS. 1 and 2 show a partial view of a disc brake and caliper, each in one piece.
Figure 2:
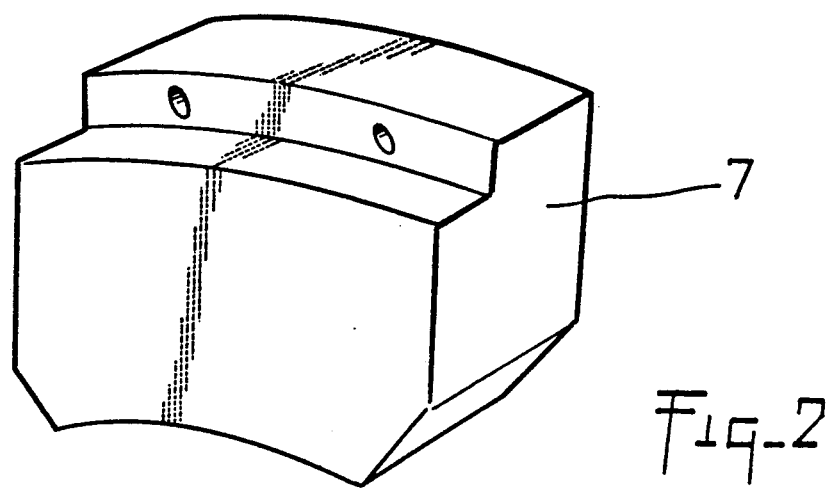

Disc 1 is frictionally coupled to monobloc caliper pads 7 the general shape of which is illustrated in FIG. 2. Pads 7 are produced from a carbon-carbon composite material constituted of a reinforcement formed of felts needled with carbon fibers 20 and having a fiber volume content of 25%, infiltrated by chemical vapor deposition of pyrocarbon 26 and of 60% volume content.

The use of such a disc brake is characterized by the fact that it allows frequent brakings, and procures an excellent stability of the braking torque for a given brake holding load, as well as good efficiency of the brake whatever the thermal conditions of that brake and the hygrometrical conditions of the environment, virtually no disc wearing (at least no measurable wear), and a wearing of the pads through brake jerks of 1.5 μm. The non-wearing of the disc is a particularly advantageous factor of this particular system since it avoids changing of the discs as in the conventional systems.

By way of comparison, a disc and pads assembly entirely produced from carbon-carbon does not permit such clear reproducibility and progressiveness of brake jerks. Moreover, the average wear observed in the same conditions of operation is 2 μm per brake jerk for the pads and 0.5 μm per brake jerk for each face of the disc.

FIGS. 3 and 4 show the elements of a multidisc brake for aircraft.

The monobloc rotor discs 10 are produced of carbon-carbon and have attachment notches 11 on their external periphery.

The monobloc stator discs 12 are produced of a composite material having the following composition:
 a bi-directional reinforcement formed by layers of carbon cloth with a 28% fiber volume content,
 an intermediate matrix phase of pyrolytic carbon infiltrated by chemical vapor deposition with a 5% volume content, and
 a main matrix phase of silicon carbide infiltrated by chemical vapor deposition with a 60% volume content.

The attachment of the stator discs is achieved via notches 13 provided on their external periphery.

The use of such a multidisc brake is characterized by the same qualities as the disc and pads brake as far as friction is concerned.

Again, FIG. 5 generally illustrates the composition of the two-friction element system according to the invention. First element A corresponds with Discs 1 and 12 of FIGS. 1 and 4 respectively, comprising the multiphase composite as discussed hereinbefore. Second element B comprises the carbon-carbon element corresponding to caliper pad 7 of FIG. 2 and Disc 10 of FIG. 3 which are proximate to and frictionally engagable with first element A.

The following table, forming part of the present description, re-groups the characteristics of different coupling of materials in frictional contact, such as:
 carbon-carbon on itself (C—C/C—C)
 composite with silicon carbide reinforcement and matrix with principal phase of silicon carbide and secondary phase of volume content varying between 5% and 25%, in friction on itself (SiC—SiC/SiC—SiC),
 composite with carbon reinforcement and matrix with principal phase of silicon carbide and secondary phase of volume content varying between 5% and 25%, in friction on itself (C—SiC/C—SiC), and
 coupling according to the invention of a carbon-carbon composite in friction on a composite with carbon reinforcement and matrix with principal phase of silicon carbide and secondary phase of volume content varying between 5% and 25% (C—C/C—SiC).

It will be noted that the values given in this Table are typical values resulting from tests and are given here for the sole reason of classifying friction couplings.

| Friction couplings of materials | C-C/C-C | SiC-SiC/SiC-SiC % secondary phase 5% to 25% | C-SiC/C-SiC % secondary phase 5% to 25% | C-C/C-SiC % secondary phase 5% to 25% |
|---|---|---|---|---|
| Relative Static Friction Coefficient* Relative Mean Dynamic Friction Coefficient* | 1 | 4 to 5 | 4 to 5 | 2 to 4 |
| 20° C. | 1 | 4.3 | 4 | 2 |
| 100° C. | | | | |
| dry | 1 | 2.2 | 2 | 1 |
| humid | 1 | 3 | 2.75 | 1.4 |
| 500° C. | 1 | 1.5 | 1.5 | 0.55 |
| 1000° C. | 1 | — | 1.25 | 0.5 |
| Relative Mean Wearing Rate at 200° C. mass temperature under a flow <100 W/cm²* | 1/1 | 0.5/0.5 | 0.5/0.5 | 1.2/0 |

*All values mentioned are relative values given with respect to the C-C/C-C coupling taken as reference.

What is claimed is:

1. A friction system, comprising:
 a first friction element having a first confronting surface, and wherein said first friction element is made of a carbon-carbon composite material;
 a second friction element having a second confronting surface, and wherein said second friction element is made of a multiphase composite material comprised of a fibrous reinforcement having fibers selected from the group consisting of carbon fibers and silicon carbide fibers, and a matrix having a principal phase which forms a major part of said matrix and is comprised of silicon carbide, and a secondary phase which forms a minor part of said matrix and is comprised of a refractory material selected from the group consisting of titanium carbide, zirconium carbide, tantalum carbide, boron carbide, elemental boron, silicon nitride, boron nitride and pyrolytic carbon, and
 wherein said first confronting surface of said first friction element confronts and is frictionally coupled to said second confronting surface of said second friction element.

2. The friction system of claim 1, wherein said refractory material of said secondary phase of said second friction element is further selected from the group consisting of pyrolytic carbon and boron nitride.

3. The friction system of claim 2, wherein said secondary phase of said second friction element comprises between 5% and 25%, by volume, of said composite material of said second friction element.

4. The friction system of claim 1, wherein said principal phase of said second friction element is produced by chemical vapor infiltration.

5. The friction system of claim 1, wherein said fibrous reinforcement of said second friction element comprises between 10% and 40%, by volume, of said composite material of said second friction element, and wherein said principal phase of said second friction element comprises between 40% and 80%, by volume, of said composite material of said second friction element.

6. The friction system of claim 1, wherein said second friction element is a disc of a disc and pads brake, and wherein said first friction element is a pad of said disc and pads brake.

7. The friction system of claim 1, wherein said first friction element is a rotor disc of a multidisc brake, and wherein said second friction element is a stator disc of said multidisc brake.

* * * * *